Dec. 26, 1961  L. MILTON ET AL  3,015,026
INTERFERENCE SIGNAL SUPPRESSION SYSTEM
Filed Oct. 7, 1958  3 Sheets-Sheet 1
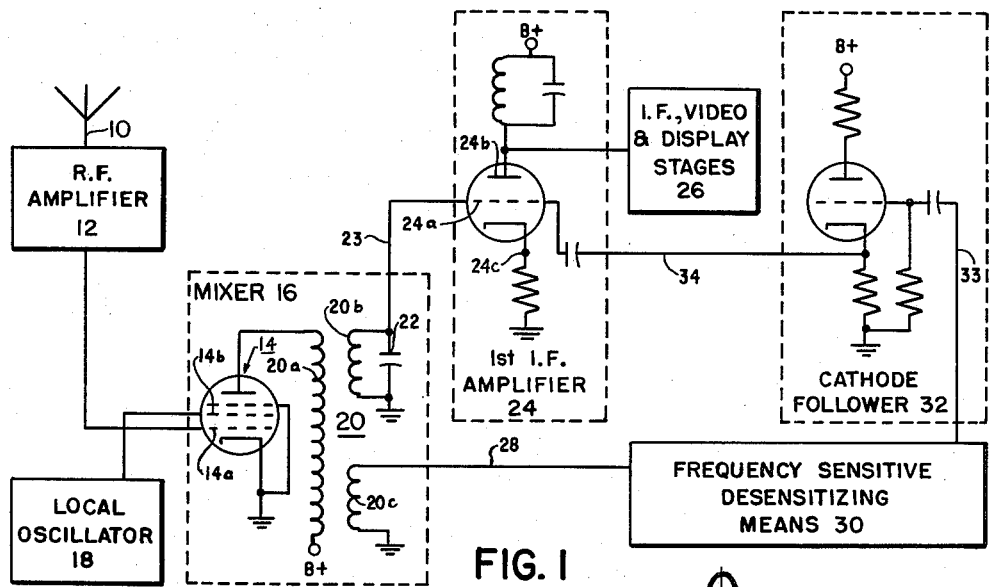
FIG. 1
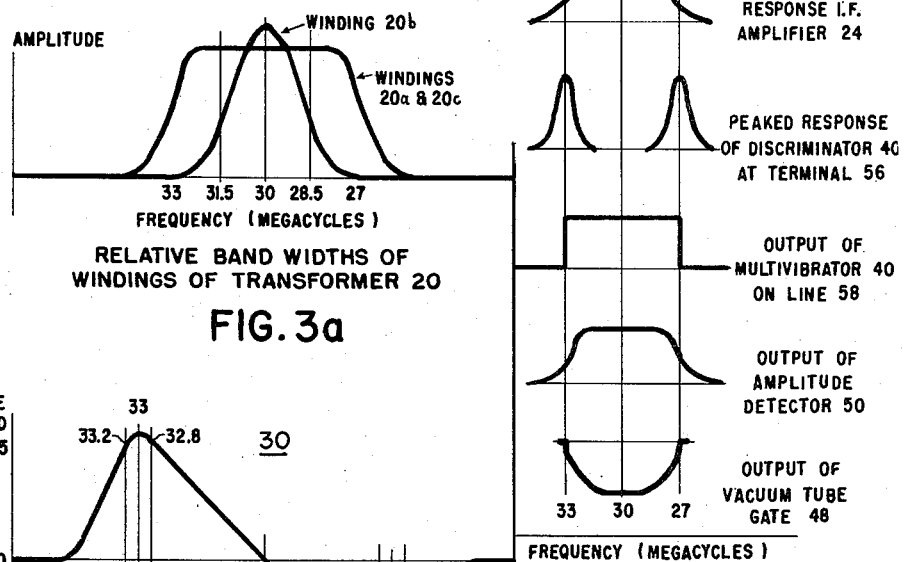
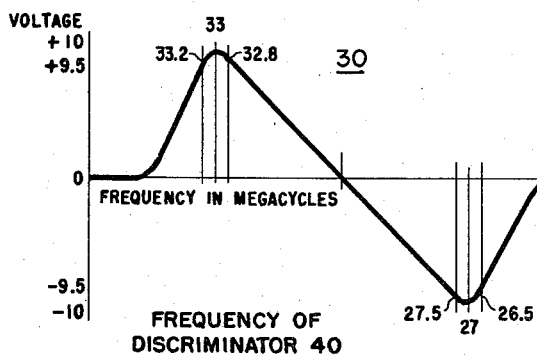
FIG. 3a
FIG. 3b
FIG. 3c
INVENTORS
LEONARD MILTON
MURRAY GUNAR
BY
ATTORNEY

INVENTORS
LEONARD MILTON
MURRAY GUNAR

BY

ATTORNEY

INVENTORS
LEONARD MILTON
MURRAY GUNAR
BY
*S.C. Yuter*
ATTORNEY 3,015,026
INTERFERENCE SIGNAL SUPPRESSION SYSTEM
Leonard Milton, Lake Success, N.Y., and Murray Gunar, Lakewood, N.J.; said Milton assignor to The Filtron Company, Inc.
Filed Oct. 7, 1958, Ser. No. 765,908
18 Claims. (Cl. 250—20)

This invention relates to interference signal suppression and more particularly to minimizing the effect on a signal receiver of interference caused by variable frequency signals.

In many types of signal receivers there arises the possibility of receiving in addition to the desired signals either spurious or deliberate interfering signals. In communication systems, these interfering signals manifest themselves usually as a form of static. In many cases the interference is no more than an annoyance, but there are times when the interference is either highly detrimental to the receiving equipment or prevents operation of the receiving equipment.

The occurrence of interference in radiolocation systems is particularly undesirable. For example, in radiolocation and ranging apparatus (radar) where the echo of a transmitted signal is employed to determine the position of a distant object, any interference may cause the mislocating of the distant object. One of the prime functions of military radar is to obtain a fix on aproaching enemy aircraft to direct weapons to the aircraft. Thus, interference may cause a misdirection of the weapons so that the hostile aircraft avoids destruction.

Usually, the radar apparatus transmits and receives signals at a given frequency. In the receiving portion of the radar apparatus conventional heterodyning techniques are employed which use tuned intermediate frequency amplifiers. Thus, regardless of the receiving frequency, these amplifiers handle signals having a constant and known frequency. These amplifiers are usually highly sensitive since the signals normally handled are of extremely small amplitude, often in the microvolt range. Therefore, whenever a signal fed to these amplifiers has a very large amplitude, the amplifiers overload (are swamped) and become inoperative or blocked for a period of time. Furthermore, if there are no memory devices in the raadar apparatus, there will be a breaking of synchronization. During this period of inoperativeness the radar apparatus is ineffective in locating or tracking its target.

A whole series of countermeasures have been developed whose purpose is to deliberately jam the radar receiver. Signal generators have been employed to transmit strong signals which are used either as decoys or to overload the amplifiers of the radar receivers. When the frequency of the interfering signal is known, it is possible to employ techniques which prevent their entry into the sensitive amplifier channels. Often known-frequency interfering signals are also generated by apparatus in close proximity to the receiver. However, it is possible to design into the receiver filtering means which prevent any deleterious effects from these fixed frequency signals.

Since an enemy may not know the operating frequencies of the radar systems, variable frequency interference signal generators may be employed which transmit high amplitude signals which sweep over a broad spectrum of frequencies. If the radar system is operating on a frequency band which is included in this spectrum, its receiving portion will be overloaded when the variable frequency generator transmits signals in the operating frequency band. Since the frequency of the interfering signal is neither known nor constant, conventional filtering techniques are ineffectual.

It is therefore an object of the invention to provide improved interference suppression apparatus.

Another object of the invention is to provide apparatus to reduce the vulnerability of receivers to variable frequency signals.

It is a further object of the invention to provide apparatus which prevents the overloading of the amplifier section of a radar receiver by a sweep frequency jamming signal.

Briefly, in accordance with one embodiment of the invention, protective apparatus for a signal receiver is provided which prevents the overloading of the amplifiers tuned to a predetermined frequency by a variable frequency signal and minimizes signal degradation caused by the interfering signal when not overloaded. The protective apparatus includes signal detection means for detecting signals at given frequencies above and below the predetermined frequency. Upon the detection of either one of these signals a desensitizing means is activated which remains activated until the variable frequency signal sweeps past the predetermined frequency band. The desensitizing means when activated decreases the sensitivity of at least one of the sensitive amplifiers. The decrease in sensitivity is related to the amplitude of the received variable frequency signal. When the desensitizing means is not activated, the sensitive amplifiers immediately return to their normal sensitivity.

An advantage of the invention is that it can be used with any type of signal receiver, including automatic tracking radar and variable frequency radar systems.

Another advantage of the invention is that the apparatus only operates while the interference is present thus permitting a return to normal operations by the system immediately upon the termination of the interference by eliminating the ill effects of excess recovery time resulting from amplifier overloading.

Still another advantage is that the interfering signal does not have to be of an amplitude that will cause overloading before the circuit will be operative. There are cases where interfering signals will cause a great deal of signal degradation without overloading. In such cases the action of this invention will greatly improve the quality of the desired signal.

A further advantage of the invention is that the apparatus guards not only against deliberate sweep frequency jamming but also against interference generated during the changing of operating frequency of a neighboring radar system, or during the adjustment of transmitters associated with radio communication systems.

Other objects, features and advantages of the invention will be evident from the following detailed description when read in connection with the accompanying drawings wherein:

FIGURE 1 shows a block diagram form, in accordance with one embodiment of the invention, apparatus for minimizing the deleterious effects of variable frequency interfering signals on the high-gain amplifiers of a signal receiver which includes a frequency sensitive desensitizing means and a mixer;

FIGURES 3a, 3b and 3c show waveforms associated with particular elements in FIGURES 1 and 2;

FIGURE 3a shows the frequency response of the windings of the output transformer of the mixer of FIGURE 1;

FIGURE 3b shows the output signal generated by the discriminator of FIGURE 2; and FIGURE 3c shows the waveforms of frequency response and output signals of several of the elements;

Figure 2:
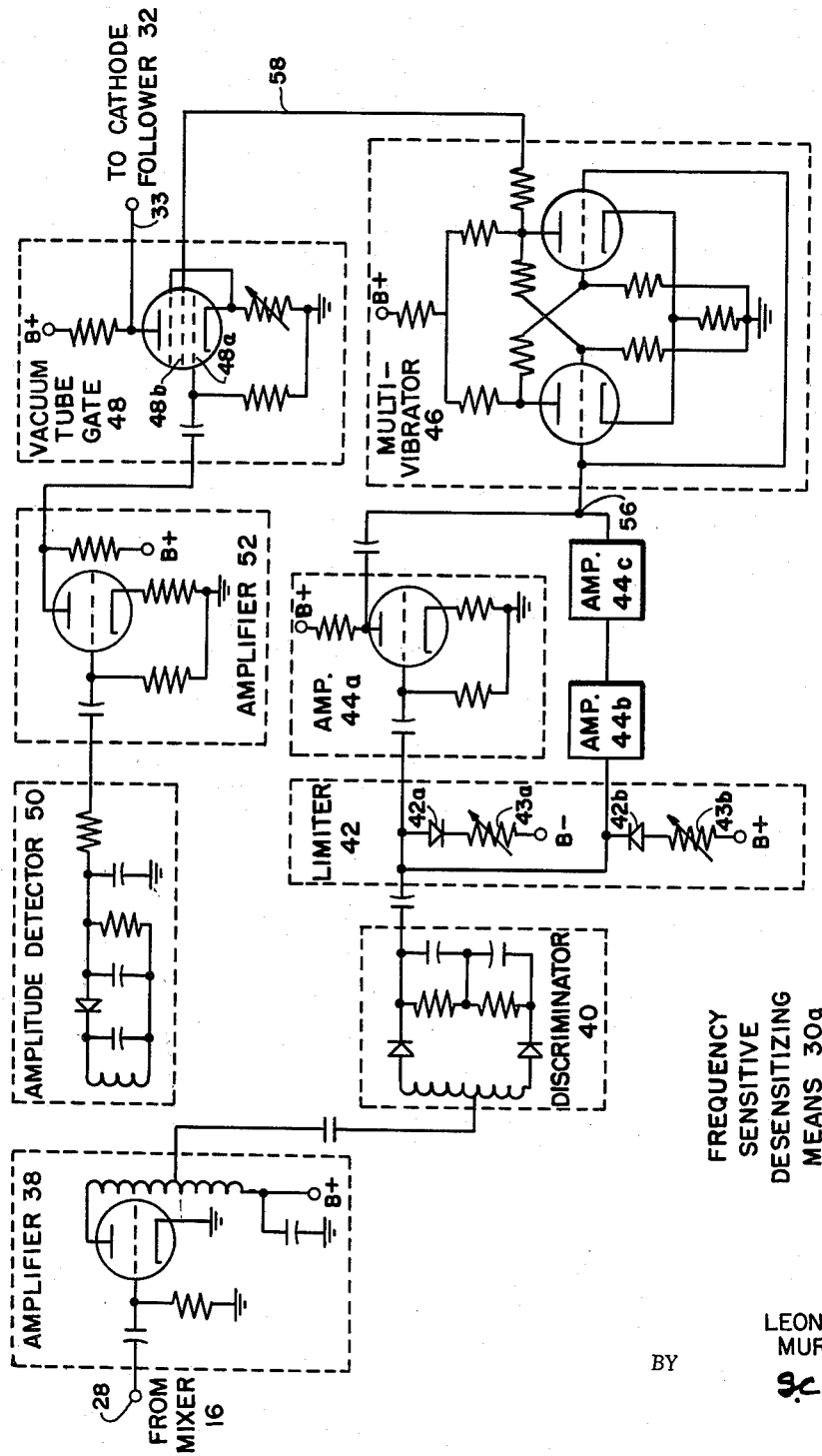
FIGURE 2 is a schematic diagram of the frequency sensitive desensitizing means of FIGURE 1 which includes a discriminator.

Referring to FIGURE 1, apparatus is shown according to one embodiment of the invention for desensitizing the first intermediate frequency (I.F.) amplifier of a radar receiver whenever an interfering signal is detected by the radar receiver.

In general, signals are received from the antenna 10 by the radio frequency (R.F.) amplifier 12 and transmitted to the mixer 16. The local oscillator 18 also transmits a signal to the mixer 16. By heterodyning, sum and difference frequencies are generated with the difference frequencies related to the operating frequency of the radar being transmitted to the first intermediate frequency (1st I.F.) amplifier 24. After amplification, these signals are fed to the additional I.F., video and display stages 26 of the radar receiver.

Whenever a variable frequency interfering signal is received by the antenna 10, the signal after mixing is transmitted via the line 28 to the frequency sensitive desensitizing means 30 which generates a desensitizing control signal. The desensitizing control signal is fed via the line 33, the cathode follower 32 and the line 34 to the 1st I.F. amplifier 24, causing a decrease in its sensitivity. The decrease in sensitivity remains until the variable frequency interfering signal sweeps beyond the operating frequency of the radar system.

Thus, the 1st I.F. amplifier 24 is controlled to amplify signals having frequencies in the operating band of the radar system, but is desensitized when variable frequency interfering signals are sensed that are approaching the I.F. band-pass of the receiver so that the high amplitude of these signals cannot overload the succeeding I.F. and video stages.

In particular, all signals are received by the antenna 10 and amplified by the R.F. amplifier 12 for transmission to the first control grid 14a of the vacuum tube 14 of the mixer 16. At the same time, the local oscillator 18 transmits a signal to the second control grid 14b of the vacuum tube 14. By the usual heterodyning action, the sum and difference frequency signals are present on the primary winding 20a of the transformer 20.

The secondary winding 20b cooperating with the capacitor 22 selects the difference frequencies for transmission via line 23 to the control grid 24a of the first intermediate frequency (1st I.F.) amplifier 24. The amplified difference frequency (the intermediate frequency) is transmitted from the anode 24b to the other I.F. stages and display stages 26 for the usual signal processing in radar receivers.

The 1st I.F. amplifier 24 and succeeding amplifiers in the video circuits are designed to handle low amplitude signals. Thus, when an interfering signal is received, the 1st I.F. amplifier 24 or other stages whose dynamic ranges may be limited cannot pass the signal and is usually overloaded. This overloading or blocking lasts for a period of time dependent upon the circuit constants in the system. To prevent this overloading or signal degradation, the transformer 20 of the mixer 16 is provided with a second output winding 20c which is coupled via line 28 to the frequency sensitive desensitizing means 30. The band width of the secondary winding 20c is about twice as wide as the band width of the secondary winding 20b and centered about the same mid-frequency point. Thus, when a frequency modulated interfering signal is transmitted from the mixer 16, the secondary winding 20c transmits this signal to the frequency sensitive desensitizing means 30 before any signal is transmitted to the 1st I.F. amplifier 24. When the frequency sensitive desensitizing means 30 receives the signal, it transmits a negative pulse to the cathode follower 32 for power amplification and transmission via the line 34 to the cathode 24c of the 1st I.F. amplifier 24.

By relating the amplitude of the signal fed to the control grid 24a of the 1st I.F. amplifier 24 with the amplitude of the interfering signal, the bias of the 1st I.F. amplifier 24 can be sufficiently increased to prevent any blocking by the interfering signal which will then be transmitted to the control grid 24a from the secondary winding 20b of the transformer 20. When the frequency modulated interfering signal has swept past the response band of the 1st I.F. amplifier 24, the bias on its control grid again returns to its normal quiescent condition and low level signals can immediately be amplified.

FIGURE 2 shows a frequency sensitive desensitizing means 30a which is suitable for incorporation in the system of FIGURE 1. Signals are received from the mixer 16 via the line 28 and are amplified by a suitable broad band amplifier 38 which is coupled to a conventional discriminator 40. The signal from the discriminator 40 is fed to the limiter 42 for selection of particular pulse peaks. The positive peak is transmitted via an amplifier 44a to the input of a conventional bistable multivibrator 46 while negative pulse peaks are amplified and inverted by the serially disposed amplifiers 44b and 44c for transmission to the input of the multivibrator 46. The multivibrator 46 transmits gating pulses to the second control grid 48b of the vacuum tube gate 48. At the same time, the broad band amplitude detector 50 receives signals from the amplifier 38. The output of the broad band amplitude detector 50 is coupled via the amplifier 52 to the first control grid 48a of the vacuum tube gate 48. The output of the vacuum tube gate 48 is fed via the line 33 to the cathode follower 32 of FIGURE 1.

The overall operation of the system will now be described in detail by making reference to both FIGURE 1 and FIGURE 2, along with the waveforms of FIGURES 3a, 3b and 3c.

In describing the operation of the system, the following assumptions will be made by way of example only: The radar receiver is adjusted to operate at 3,000 megacycles; the intermediate frequency is 30 megacycles and the local oscillator frequency is 3,030 megacycles. Accordingly, FIGURE 3a shows the relative band widths of the windings of the transformer 20. The curve of the frequency response of the secondary winding 20b (FIG. 1) of the mixer 16 shows that the band width centers around the frequency of 30 megacycles and is down three decibels at about 31.5 megacycles and 28.5 megacycles. The primary winding 20a and the secondary winding 20c are shown to have a band width of about 6 megacycles centered about the 30 megacycle point. Therefore, increasing or decreasing frequency signals will be transmitted from the secondary winding 20c before any signals are transmitted from the secondary winding 20b.

When a frequency modulated jamming signal, which is sweeping from a low to a high frequency, is received by the antenna 10 (FIG. 1), it is amplified by the R.F. amplifier 12. As its frequency approaches 2,997 megacycles, the output frequency of the mixer 16 will approach 33 megacycles. At this frequency, a signal will be transmitted from the secondary winding 20c via the line 28 to the amplifier 38 (FIG. 2), and no signal will be transmitted to the 1st I.F. amplifier 24 (FIG. 1). The discriminator 40 (FIG. 2) starts transmitting a signal as shown in FIGURE 3b. The pass band of the discriminator 40 is approximately equal to the pass band of the secondary winding 20c of the mixer 16. If the discriminator 40 is designed to have a positive ten volt peak output at 33 megacycles and a negative ten volt peak output at 27 megacycles, the diodes 42a and 42b in the limiter 42 are biased to permit the passage of just the peaks of the voltages developed. In particular, the diode 42a is biased by means of a variable resistor 43a coupled to a negative potential B— to pass only signals which are less than minus 9.5 volts and the diode 42b is biased by means of the variable resistor 43b coupled to a positive potential B+ to pass only signals having a voltage more positive than plus 9.5 volts. The positive peak centered around 33 megacycles is basically a pulse which is amplified by amplifiers 44b and 44c and transmitted to terminal 56 to set the multivibrator 46 (a conventional Eccles-Jordan flip flop) in a first stable state. The output of the multivibrator 46 then goes positive and a positive voltage is transmitted via the line 58 to the vacuum tube gate 48 where this voltage is applied to its second control grid 48b to alert the vacuum tube gate 48. At the same time, the amplitude detector 50, which has a band pass slightly narrower than the discriminator 40, starts transmitting a positive signal to the amplifier 52. The positive signal is fed to the first control grid 48a of the vacuum tube gate 48. The output of the vacuum tube gate 48 is transmitted as a positive signal via the line 33 to the cathode follower 32 (FIG. 1) for power amplification and transmission via the line 34 to the control grid 24a of the 1st I.F. amplifier 24. FIGURE 3c shows the relationships of the waveforms referred to above.

By a suitable design of the circuit components, particularly in the amplifier 52, the amplitude of the signal fed to the control grid 24a via the line 34 effectively increases the bias of the 1st I.F. amplifier 24 so that it becomes desensitized to the increased amplitude interfering signals that will be fed to its control grid when the output of the mixer 16 is a 30 megacycle signal (allowing the desired signal to pass at 30 megacycles in spite of the interfering signal). The desensitization of the first I.F. amplifier 24 continues until the interfering signal frequency approaches 3,003 megacycles; that is, when the frequency of the signal transmitted from the mixer 16 approaches 27 megacycles. In particular, when the frequency is abount 27.5 megacycles, a negative pulse is transmitted from the limiter 42 (FIG. 2), amplified and inverted by the amplifier 44a and fed to the terminal 56. The pulse now present at the terminal 56 returns the multivibrator 46 to its initial stable state and the voltage on the line 58 decreases in amplitude to block the vacuum tube gate 48. Therefore, the bias on the 1st I.F. amplifier 24 returns to its initial state and the amplifier is again sensitive to low amplitude signals.

It should be noted that the desensitizing circuits are bi-directional; that is, assume the jamming frequency traverses from a high frequency to a low frequency instead of from a low frequency to a high frequency as described above. When the mixer frequency is approximately 27 megacycles, the first pulse transmitted from the limiter 42 is passed through the amplifier 44a to change the state of the multivibrator 46 and start the desensitizing action. When the mixer frequency is approximately 33 megacycles, a second pulse is transmitted from the discriminator 40 via the limiter 42 and the amplifiers 44b and 44c to return the multivibrator 46 to its initial stable state and end the desensitizing action.

Thus, there has been shown improved apparatus which prevents the overloading of amplifiers such as the intermediate frequency amplifiers of a radar receiver by a sweep frequency jamming signal.

Figure 4:
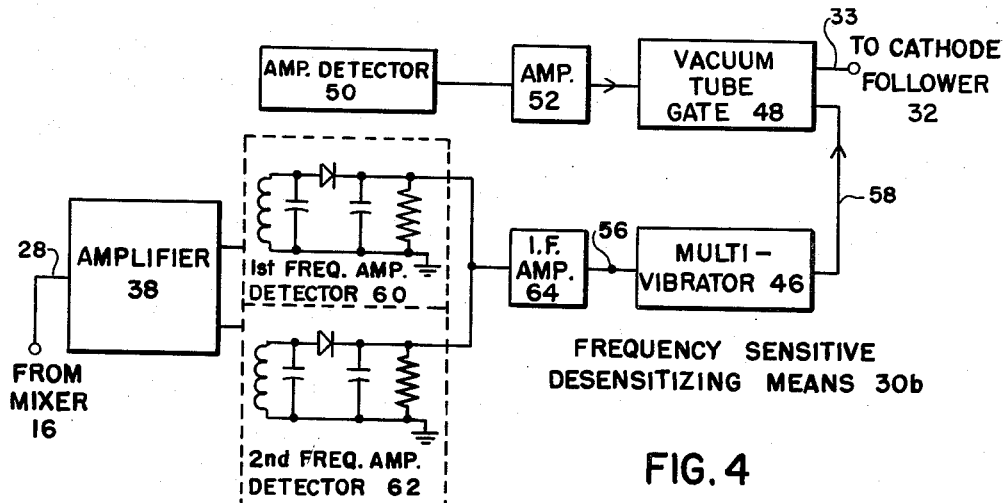
FIGURE 4 shows primarily in block diagram form another embodiment of the frequency sensitive desensitizing means of FIGURE 1.

FIGURE 4 shows an alternative embodiment, the frequency sensitive desensitizing means 30b. In this particular embodiment, the discriminator 40 and the amplifiers 44 (FIG. 2) are replaced by a first frequency amplitude detector 60 which is sharply tuned to 33 megacycles, a second frequency amplitude detector 62, which is sharply tuned to 27 megacycles, and an intermediate frequency amplifier 64 with a six megacycle band width centered around 30 megacycles. Except for these changes, the remaining components are identical with the frequency sensitive desensitizing means 30a of FIGURE 2. During operation, when the frequency modulated interfering signal is being swept from a low frequency to a high frequency, the output of the mixer 16 first approaches 33 megacycles. About the 33 megacycle region, the first frequency amplitude detector 60 transfers a pulse to the I.F. amplifier 64. The amplified pulse triggers the multivibrator 46 as previously described. As the jamming frequency approaches 3,003 megacycles, the output of the mixer 16 approaches 27 megacycles. This signal is amplified by the amplifier 38 and is detected by the second frequency amplitude detector 62. Upon detection of this signal, a pulse is transmitted to the I.F. amplifier 64 for amplification. The amplified pulse returns the multivibrator 46 to its initial stable state.

It is noted that except for the generation of the pulses which are used to change the stable states of the multivibrator 46, the frequency sensitive desensitizing means 30b operates in the same manner as the frequency sensitive desensitizing means 30a. It may be desirable in the design of the intermediate frequency amplifier 64 to adjust the biasing so that there will be no signal transmission unless the signals at its control grid are above a certain amplitude. This prevents the circuits from responding to interference below certain unimportant minimum levels.

Figure 5:
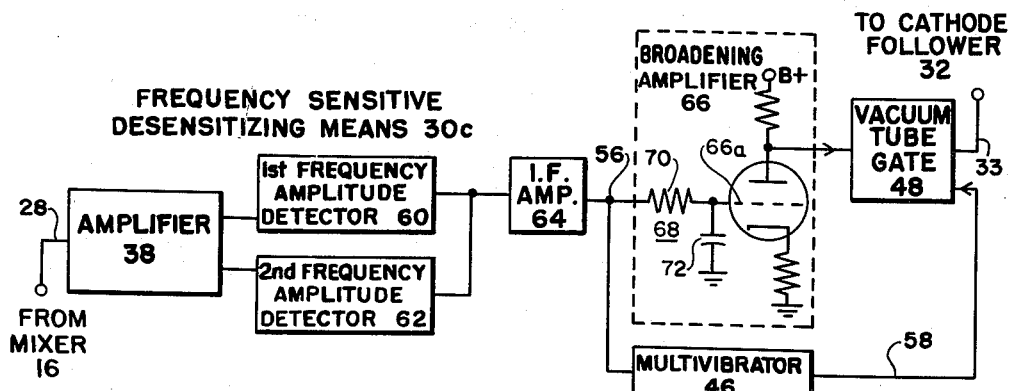
FIGURE 5 shows primarily in block diagram form a further embodiment of the frequency sensitive desensitizing means of FIGURE 1.

FIGURE 5 shows another embodiment, the frequency sensitive desensitizing means 30c. In this particular embodiment, the amplitude detector 50 and the amplifier 52 (FIG. 1) are omitted and instead a broadening amplifier 66 couples the output of the intermediate frequency amplifier 64 to the first control grid of the vacuum tube gate 48. The broadening amplifier 66 is similar to the intermediate frequency amplifier 64 except that an integrating network 68 comprising a resistor 70 and capacitor 72 is coupled to the control grid 66a. By proper design, the time constant of the integrating network 68 is adjusted to amply cover the time duration or interval between the start and end of the interfering signals and yet be responsive to any change in their amplitude. When the output of the mixer 16 has a frequency of 33 megacycles, the first frequency amplitude detector 60 transmits a pulse which is amplified by the intermediate frequency amplifier 64 and is transmitted to both the broadening amplifier 66 and the multivibrator 46. The pulse fed to the broadening amplifier 66 is broadened by the well-known integrator action and is transmitted to the first control grid of the vacuum tube gate 48 for transmission under the control of the multivibrator 46 to the cathode follower 32. Similarly, when the output of the mixer 16 has a frequency of about 27 megacycles, a similar action takes place. Thus, whether the frequency modulated interfering signal is sweeping from a high to a low frequency or from a low frequency to a high frequency, the frequency sensitive desensitizing means 30c is operative to prevent any overloading of the first intermediate frequency amplifier 24 of FIGURE 1. Although there are desensitizing periods at both the beginning and the end of the intermediate frequency band, these are of a duration which is not critical to the overall operation of the radar receiver. This results from a proper choice of time constants and the gate 48 is cut off the moment the succeeding pulse returns the multivibrator 46 to its original state.

Figure 6:
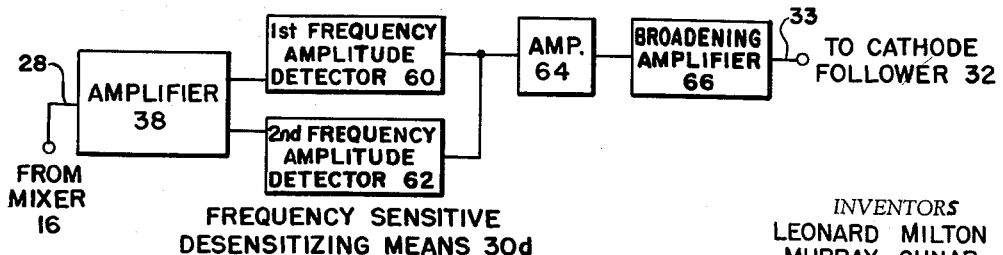
FIGURE 6 shows in block diagram form a still further embodiment of the frequency sensitive desensitizing means of FIGURE 1.

A still further alternative embodiment, the frequency sensitive desensitizing means 30d is shown in FIGURE 6. The apparatus of FIGURE 6 is the same as the apparatus of FIGURE 5 except that both the multivibrator 46 and the vacuum tube gate 48 are eliminated. In this particular case, the output of the broadening amplifier 66 is fed directly to the cathode follower 32 of FIGURE 1 via the line 33. Except for the elimination of these components, the remaining components are identical with the previously described components of FIGURE 5. Thus, when a pulse is transmitted from either of the frequency amplitude detectors 60 or 62, and amplified by the intermediate frequency amplifier 64, the broadened pulse transmitted by the broadening amplifier 66 is used to change the sensitivity of the 1st I.F. amplifier 24 of FIGURE 1.

There has thus been shown a system for preventing the overloading of the high gain circuits of a signal receiver by a frequency changing interfering signal. This interfering signal, whether it is a deliberate sweep frequency jamming signal or a transient variable frequency signal, is used to activate desensitizing circuits which prevent any deleterious effects on the high gain stages of the signal receiver.

While only four representative embodiments of the invention disclosed herein have been outlined in detail, there will be obvious to those skilled in the art many modifications and variations accomplishing the foregoing objects and realizing many or all of the advantages but which do not depart essentially from the spirit of the invention. For example, transistors and other signal control units may be used in place of the vacuum tubes.

What is claimed is:

1. Signal receiving means susceptible to signals sweeping a band of frequencies between a first frequency and a second frequency comprising amplifying means responsive to signals having frequencies within said band of frequencies, first frequency responsive means responsive to a frequency at one end of said band of frequencies, second frequency responsive means responsive to a frequency at the other end of said band of frequencies, and desensitizing means responsive to said first and second frequency responsive means to continually desensitize said amplifying means during the period from the receipt of signals having frequencies at one end of said band of frequencies to the receipt of signals having frequencies at the other end of said band of frequencies.

2. In signal receiving apparatus with an amplifying means responsive to signals having a given frequency, means for preventing the overloading of the amplifying means comprising signal sensing means responsive to signals having frequencies in a band of frequencies encompassing said given frequency, desensitizing means responsive to said signal sensing means for decreasing the sensitivity of said amplifying means, and means for activating said desensitizing means to decrease the sensitivity of said signal sensing means when said signal sensing means receives a signal having a frequency at one end of said band of frequencies and for continually maintaining said signal sensing means in a decreased sensitivity state until said signal sensing means receives a signal having a frequency at the other end of said band of frequencies.

3. In signal receiving apparatus with an amplifying means responsive to signals having a given frequency, means for preventing the overloading of the amplifying means by signals sweeping frequencies in a band of frequencies encompassing said given frequency comprising signal sensing means responsive to the signals sweeping frequencies in said band of frequencies encompassing said given frequency, and desensitizing means responsive to said signal sensing means for continually maintaining the sensitivity of said amplifying means at a decreased state for the period beginning when said signal sensing means receives a signal having a frequency at one end of said band of frequencies and ending when said signal sensing means receives a signal having a frequency at the other end of said band of frequencies.

4. Apparatus for preventing a changing frequency signal sweeping a band of frequencies from overloading a signal amplifying means responsive to signals having a given frequency within said band of frequencies comprising signal detection means for detecting said changing frequency signal by being responsive to a first signal having a frequency at one end of said band of frequencies and a second signal having a frequency at the other end of said band of frequencies, said signal detection means including means for transmitting signals in response to said first and second signals, and a bistable switching means responsive to said signal transmitting means to change from a first stable state to a second stable state upon receipt of a signal transmitted in response to said first signal and from said second stable state to said first stable state upon receipt of a signal transmitted in response to said second signal, said switching means controlling the amplification of said signal amplifying means by limiting the amplification of said signal amplification means during the period when in said second stable state.

5. Apparatus for preventing the sweep frequency jamming of a signal amplifier having a signal amplifying unit for amplifying signals of a predetermined frequency comprising signal detection means for detecting a first signal having a frequency lower than the predetermined frequency and a second signal having a frequency above the predetermined frequency, said signal detection means including means for transmitting a signal when detecting either the first or second signals, a bistable switching means responsive to said signal detection means to change from a first stable state to a second stable state upon receipt of a signal, said bistable switching means when in its second stable state decreasing to a constant value the sensitivity of said signal amplifying and when in its first stable state increasing the sensitivity of said signal amplifying device.

6. The apparatus of claim 5 wherein said signal detection means includes a doubly-tuned discriminator.

7. The apparatus of claim 5 wherein said signal detection means includes a doubly-tuned discriminator and first and second limiters responsive to the doubly-tuned discriminator.

8. The apparatus of claim 5 wherein said signal detection means includes a first diode detector having tuning means for detecting the first signals, and a second diode detector having tuning means for detecting the second signals.

9. The apparatus of claim 5 wherein said bistable switching means comprises a bistable multivibrator.

10. Apparatus for preventing the sweep frequency jamming of a signal amplifying receiver having a biasable signal amplifying unit for amplifying signals of a given frequency comprising signal detection means for detecting a first signal of a frequency lower than the given frequency and a second signal of a frequency higher than the given frequency, said signal detection means including means for transmitting a signal upon the detection of either said first or second signals, a bistable switching means changing stable states each time a signal is transmitted by said signal detection means, a bias control means responsive to said bistable switching means for controlling the bias of the bistable signal amplifying unit to a given value related to the amplitude of the received signal when the bistable switching means is in a first stable state and to a given constant value when the bistable switching means is in the second stable state.

11. The apparatus of claim 10 wherein the bistable switching means includes a bistable multivibrator.

12. The apparatus of claim 10 wherein said bias control means includes a detector for detecting the amplitude of the received signal.

13. The apparatus of claim 10 wherein said bias control means includes a detector for detecting the amplitude of the received signal and transmitting a signal related to the amplitude, and a gating means responsive to the detector and the bistable switching means.

14. The apparatus of claim 10 wherein said bias control means includes a diode detector for detecting the amplitude of the received signal and transmitting a signal related to the amplitude of the received signal, and a gating means responsive to said diode detector to transmit a bias voltage to said bistable signal control unit under the control of said bistable switching means, said bistable switching means permitting the transmission of the bias voltage by the gating means when in a first stable state and preventing the transmission of the bias voltage when in the second stable state.

15. Apparatus for preventing the overloading by a variable frequency signal of the video of a radar receiver by controlling the bias of an intermediate frequency vacuum tube amplifier responsive to the mixer stage of the radar receiver, said apparatus comprising a doubly-tuned discriminator tuned to a frequency above the intermediate frequency and to a frequency below the intermediate frequency, first and second limiters responsive to said doubly-tuned discriminator for permitting the transmission of signals having predetermined amplitudes, first and second amplifying means responsive to said first and second limiters for amplifying the transmitted signals, a bistable multivibrator responsive to said first and second amplifying means, said bistable multivibrator changing stable states each time a signal is received from said first or said second amplifying means, a controllable vacuum tube amplifier having a first control grid responsive to said bistable multivibrator for controlling the operation of said controllable vacuum tube amplifier, a diode detector responsive to the mixer to develop a voltage related to the amplitude of the signals transmitted by said mixer, a third amplifying means responsive to said diode detector for amplifying the developed voltage, said amplifying means being coupled to a second control grid of said vacuum tube amplifier, said controllable vacuum tube amplifier being coupled to the biasing means of the intermediate frequency vacuum tube amplifier.

16. Apparatus for preventing the overloading by a variable frequency signal of the video or I.F. stages of a radar receiver by controlling the bias of an intermediate frequency vacuum tube amplifier responsive to the mixer stage of the radar receiver, said apparatus comprising first and second diode detectors responsive to the mixer stage, said first diode detector being tuned to a frequency below the intermediate frequency, said second diode detector being tuned to a frequency above the intermediate frequency, a first amplifying means responsive to said first and second diode detectors, a bistable multivibrator responsive to said first amplifying means, said bistable multivibrator changing stable states whenever a signal is received from said first amplifying means, a multi-control-grid vacuum tube amplifier having a first control grid responsive to said bistable multivibrator to control the operation of the multi-control-grid vacuum tube amplifier, a third diode detector responsive to said mixer stage, said third diode detector being tuned to a band of frequencies which extends from the frequency to which the first diode detector is tuned to the frequency to which the second diode detector is tuned, a second amplifying means responsive to said third diode detector said second amplifying means being coupled to the second control grid of said multi-control-grid vacuum tube amplifier, said multi-control-grid vacuum tube amplifier being coupled to the biasing means of the intermediate frequency vacuum tube amplifier so that when said bistable multivibrator is in a first stable state, a voltage related to the amplitude of the signal transmitted from the mixer stage is transmitted to the biasing means of the intermediate frequency vacuum tube amplifier.

17. Apparatus for preventing the overloading by a variable frequency signal of a radar receiver by controlling the biasing means of an intermediate frequency vacuum tube amplifier responsive to the mixer stage of the radar receiver, said apparatus comprising first and second diode detectors responsive to the mixer stage, said first diode detector being tuned to a frequency below the intermediate frequency, said second diode detector being tuned to a frequency above the intermediate frequency, a first amplifying means responsive to said first and second diode detectors to amplify the signals transmitted by said first and second diode detectors, a bistable multivibrator responsive to said first amplifying means, said bistable multivibrator changing stable states upon receipt of a signal from said first amplifying means, a multi-control-grid vacuum tube amplifier having a first control grid responsive to said bistable multivibrator to control its operation, a second amplifying means responsive to said first amplifying means, said second amplifying means including pulse broadening means to increase the time duration of received signals, a second control grid of said multi-control-grid vacuum tube being responsive to said second amplifying means, the biasing means of the intermediate frequency vacuum tube amplifier being responsive to said multi-control-grid vacuum tube to receive a voltage related to the amplitude of signal transmitted by the mixer when said bistable multivibrator is in a first stable state.

18. Apparatus for preventing the overloading by a variable frequency signal of a radar receiver by controlling the biasing means of an intermediate frequency vacuum tube amplifier responsive to the mixer stage of the radar receiver, said apparatus comprising first and second diode detectors responsive to the mixer stage, said first diode detector being tuned to a frequency below the intermediate frequency, said second diode detector being tuned to a frequency above the intermediate frequency, amplifying means responsive to said first and second diode detectors, said amplifying means including signal broadening means for increasing the time duration of received signals, the biasing means being responsive to said amplifying means such that the bias on the intermediate frequency vacuum tube amplifier is increased for a predetermined period of time whenever said first or said second diode detectors transmit a signal.

References Cited in the file of this patent
UNITED STATES PATENTS

| | | |
|---|---|---|
| 2,489,254 | Arnold | Nov. 29, 1949 |
| 2,538,040 | Pritchard | Jan. 16, 1951 |
| 2,685,643 | Fisk | Aug. 3, 1954 |
| 2,761,964 | Rosenzvaig | Sept. 4, 1956 |
| 2,914,668 | Wasmansdorff | Nov. 24, 1959 |